United States Patent [19]
Bröttgårdh et al.

[11] Patent Number: 5,669,948
[45] Date of Patent: Sep. 23, 1997

[54] SEPARATING ARRANGEMENT AND METHOD FOR COUNTERACTING FOAM FORMATION

[75] Inventors: Göran Bröttgårdh, Årjäng; Ulf Jansson, Karlstad, both of Sweden

[73] Assignee: Kamyr AB, Sweden

[21] Appl. No.: 256,117

[22] PCT Filed: Dec. 3, 1992

[86] PCT No.: PCT/SE92/00835

§ 371 Date: Jun. 23, 1994

§ 102(e) Date: Jun. 23, 1994

[87] PCT Pub. No.: WO93/12889

PCT Pub. Date: Jul. 8, 1993

[30] Foreign Application Priority Data

Dec. 23, 1991 [SE] Sweden .................. 9103824

[51] Int. Cl.$^6$ .................................... B01D 45/12
[52] U.S. Cl. ........................................ 55/459.1
[58] Field of Search ................ 95/242, 261; 96/176, 96/195; 55/337, 345, 325, 344, 459.1; 406/173

[56] References Cited

U.S. PATENT DOCUMENTS

| | | | |
|---|---|---|---|
| 3,516,551 | 6/1970 | Wallen et al. | 210/512 |
| 3,668,838 | 6/1972 | McNeil et al. | 96/195 |
| 3,753,336 | 8/1973 | Drew et al. | 210/512 |

FOREIGN PATENT DOCUMENTS

| | | |
|---|---|---|
| 0141073 | 5/1985 | European Pat. Off. . |
| 0475252 | 3/1992 | European Pat. Off. . |
| 1248630 | 8/1986 | U.S.S.R. . |

OTHER PUBLICATIONS

Perry's Chemical Engineers' Handbook, 6th Ed., McGraw Hill Book Company, 1984, pp. 18–73 and 20–83 to 20–88.

Primary Examiner—Thomas R. Weber
Attorney, Agent, or Firm—Lerner, David, Littenberg, Krumholz & Mentlik

[57] ABSTRACT

The present invention relates to a cyclone, mainly for separating liquid from gas/vapor which is formed on pressure reduction of spent cooling liquor in connection with pulp production. The cyclone includes a casing, an inlet arrangement, a lower outlet line for liquid and an upper outlet line for vapor and gas. The inlet arrangement is connected to a supply line with a valve and the inlet arrangement consists of an exchangeable insertion pipe, the length of which exceeds one meter, preferably two meters and is most preferably between 2.5 and 3.5 meters long.

20 Claims, 4 Drawing Sheets

SEPARATING ARRANGEMENT AND METHOD FOR COUNTERACTING FOAM FORMATION

FIELD OF THE INVENTION

The following invention relates to a cyclone, mainly for separating liquid from gas/vapour which is formed on pressure reduction of spent cooking liquid in connection with pulp production, comprising a casing, an inlet arrangement, a lower outlet line for liquid and an upper outlet line for vapour and gas, said inlet arrangement being connected to a supply line with a valve. The invention relates to a cyclone of the abovementioned type which is cost-effective and which can in a flexible manner be optimised with regard to different operating conditions. The invention also relates to a method for counteracting foam formation.

BACKGROUND OF THE INVENTION

Cyclones are used in the main for separating a liquid phase from a gas/vapour phase. In industry today, use is in general made of cyclones which are specially manufactured with regard to the operating conditions in which the cyclone is principally to work. This trend towards special manufacturing leads to a small batch size, which in turn gives rise to relatively high costs. Furthermore, cyclones known today are in most cases constructed in such a manner that they cannot be adapted to different operating conditions, at least not without a considerable effort, as a result of which they often, in the event of a change in the production process, come to be used in operating conditions which are not optimum.

GB-A-550260 and U.S. Pat. No. 3,516,551, for example, show that this last-mentioned problem has been known for a long time and that there is a number of proposals for solutions of said problem. Common to known solutions, however, is the fact that flow variations are compensated in direct connection with the inlet into the cyclone by, in the case of a small flow, reducing the flowthrough area in the inlet arrangement of the cyclone so that the inlet rate is kept almost constant in order to obtain an optimum separation and by, in the case of a large flow, doing the opposite. In the case of liquids with a tendency to foam, however, such a solution proves to have undesirable after-effects, since the regulation gives rise to a change in the flow pattern and causes a pressure drop which in turn, because of the vapour formation etc., leads to an uneven flow pattern in connection with the outflow inside the cyclone and is thus a cause of foam formation. Foam formation is very disadvantageous since it disturbs the flow conditions inside the cyclone and thus counteracts optimum operating conditions.

SUMMARY OF THE INVENTION

The aim of the following invention is to produce a cyclone which at least in the main eliminates the abovementioned problem, so that a cyclone is made available, with the aid of which it is possible in a flexible manner to adapt the inlet arrangement to prevailing operating conditions so that the outflow rate inside the cyclone can be optimised and that such an inlet arrangement is constructed in such a manner that it counteracts the appearance of foam.

The abovementioned aim is achieved with the aid of an inlet arrangement which consists of an exchangeable insertion pipe with essentially constant cross-sectional area, the length of which exceeds 1 meter. In the preferred case, the length of said insertion pipe exceeds 2 meters, and it has proved to be particularly advantageous in connection with pressure release of spent cooking liquid from a digester for pulp production if the insertion pipe has a length of between 2.5 and 3.5 m.

With the aid of a set of insertion pipes with different cross-sectional areas, that is to say in the preferred case different diameters, it is possible to select an insertion pipe which has a diameter adapted to the relevant operating conditions, so that an optimum inflow rate into the cyclone is obtained. Furthermore, it is brought about, owing to the length of the pipe, that is to say more than 1 meter, that the foam formation is reduced in connection with outflow from the pipe inside the cyclone, and that the foam which is formed all the same is, owing to the controlled inflow, "broken up" with the aid of the centrifugal force. The reason for this is that in this manner a sufficiently long "recovery distance" is created for the liquid/gas mixture for recreating an even flow pattern after a pressure drop which has been caused by any arrangement directly before the inlet into said insertion pipe. Usually, said arrangement is a regulating valve, with the aid of which the flow into the cyclone is regulated. Such a regulating valve therefore causes a pressure drop which gives rise to turbulence and an uneven flow pattern. Other arrangements also, such as unevennesses in connections, can, however, cause such a pressure drop. It is thus important that the last part of the inlet arrangement into the cyclone is constructed in such a manner that it counteracts the appearance of pressure drop, according to the invention.

A preferred area of application for the invention is "flashing" of black liquor, that is to say reduction of the pressure of liquor from a pressurised digester for production of sulphate cellulose pulp. Because pressure and temperature in this connection are normally relatively high (approximately 4-5 bar and 150°-180° C. respectively), the pressure reduction (flashing) must normally take place in a number of stages and use is therefore made of a number of series-connected cyclones. In a preferred embodiment according to the invention, use is thus made of at least two cyclones designed according to the invention connected in series, different insertion pipes being used in order to obtain essentially the same inlet rate in each cyclone.

Also important in connection with cyclones is that they are constructed in such a manner that the final separation of liquid phase and gas phase inside the cyclone is as effective as possible, which can be a problem in particular in connection with high inlet rates. The arrangement according to the invention therefore also has special arrangements (collar on gas outlet or anti-swirl plate as the case may be) in order to avoid liquid accompanying the gas flow out of the cyclone. Furthermore, the cyclone is otherwise constructed in such a manner that unnecessary shapings which increase the price, such as a certain conical form, have been eliminated if not necessary and otherwise consideration has also been given to the fact that the production cost is to be kept as low as possible.

A BRIEF DESCRIPTION OF THE DRAWINGS

The invention will be explained in greater detail below with the aid of the attached figures, in which:

FIG. 1 shows a partially axially cut-away preferred embodiment of a cyclone according to the invention, FIG. 2 shows a cross-section of a cyclone according to FIG. 1 seen from above along the marking I—I, FIG. 3 shows an alternative mounting of an insertion pipe according to the invention, FIG. 4 shows a cyclone according to the invention in perspective.

DESCRIPTION OF THE PREFERRED EMBODIMENTS

Figure 1:
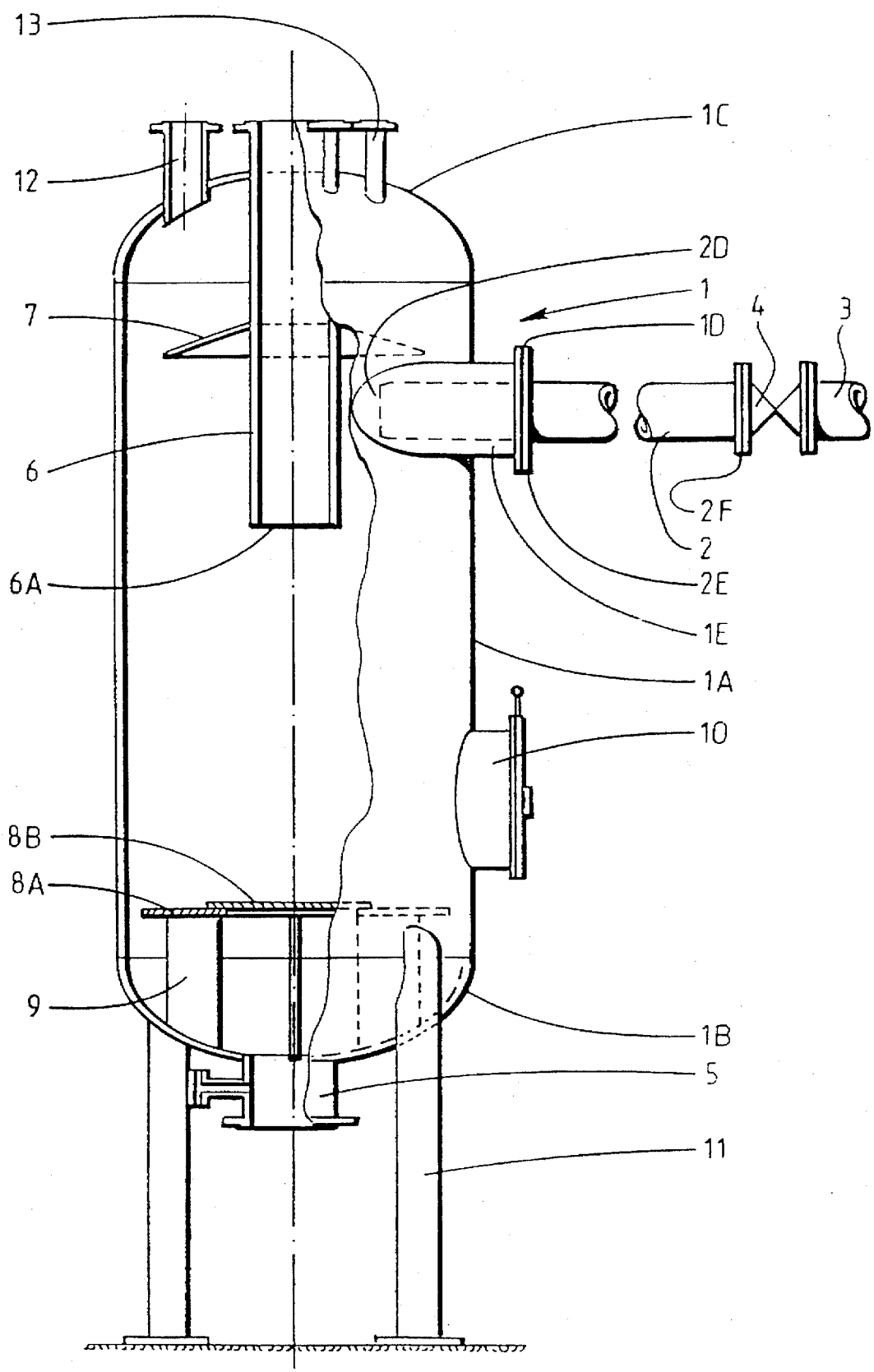

In FIG. 1, a cyclone 1 according to a preferred embodiment according to the invention is shown, in which the cyclone walls 1A themselves are of cylindrical design and the bottom 1B and top 1C respectively are designed as cupped gables. The design is expediently adapted according to applicable standards for pressure vessels. With the aid of an insertion pipe 2 which is connected to a supply pipe 3, at the end of which a regulating valve 4 is located, it is possible to regulate the inflow into the cyclone 1 in an optimum manner. The gas separated in the cyclone 1 is conducted out through an outlet pipe 6 which is arranged in the top gable 1C and the liquid is conducted out through a lower pipe 5. The mouth 2D of the insertion pipe is positioned in such a manner that it opens above the lower end 6A of the outlet pipe 6 for the gas, for the purpose of preventing liquid from being capable of spraying directly into said inlet 6A. Furthermore, the upper pipe 6 is provided with a collar 7 in order to prevent drops travelling down along the outside on the pipe 6 and in through the mouth 6A. A further measure for avoiding liquid accompanying the gas flow is the arrangement of an "anti-swirl plate" 8A, 8B which is arranged on stays 9 directly above the bottom inside the cyclone. The plate is divided up and consists of an external annular part 8A, on top of and in front of which a homogeneous circular part 8B is arranged. Owing to the anti-swirl plate 8, the liquid which accumulates in the bottom of the cyclone cannot be carried away by the swirl which is formed in the central parts of the cyclone. Moreover, the figure shows that the cyclone is provided with a manhole 10, a pipe connection piece for measuring devices 13, a connection piece for a safety valve and that it is expediently erected on legs 11.

Figure 2:
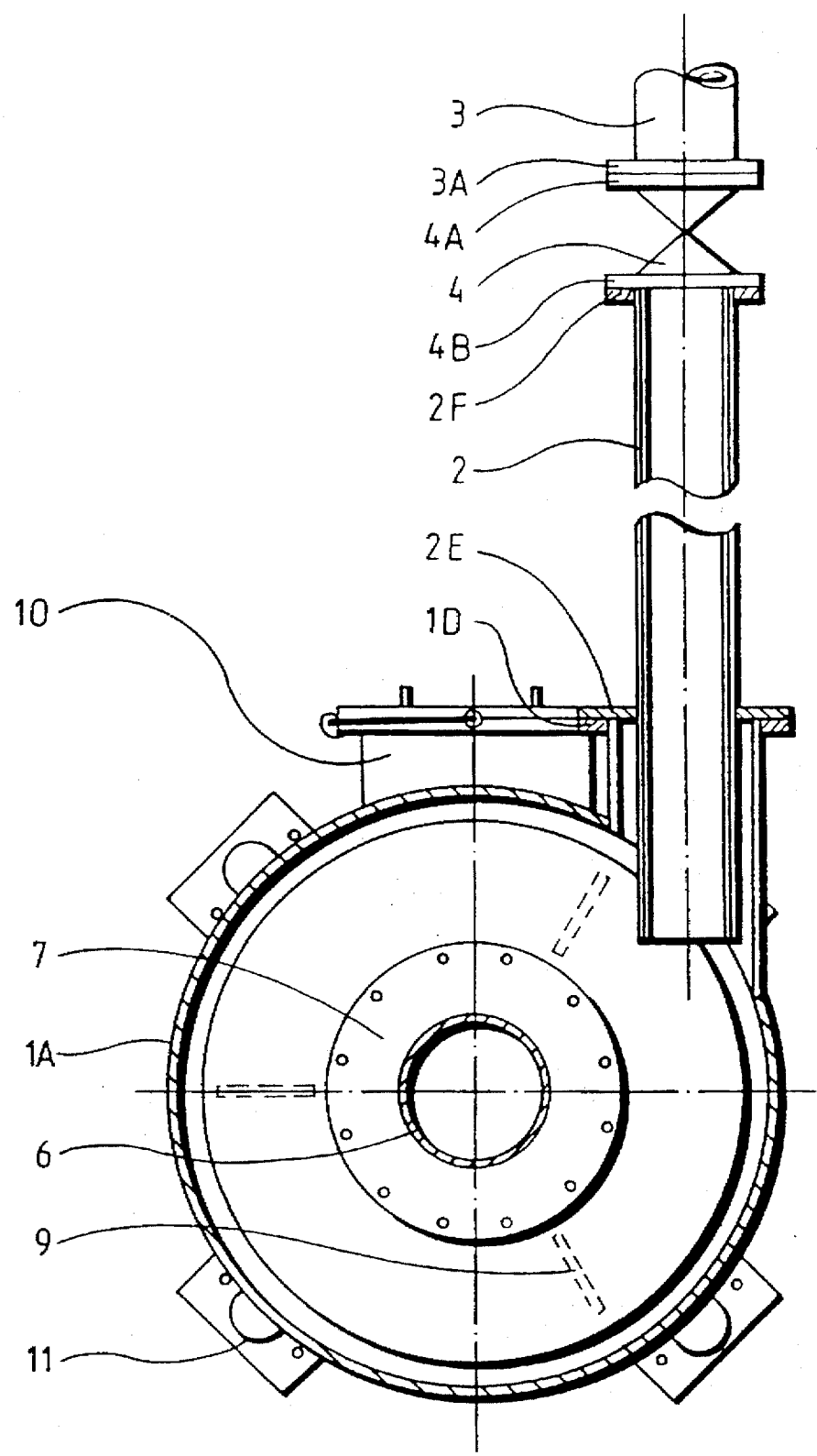

The insertion pipe 2 is in this preferred case made exchangeable with the aid of division into a front 2 and a rear part 4, the rear part 4 preferably consisting of the regulating valve itself (see FIG. 2). A front flange 2E, which is fixed on the front half of the insertion pipe, is in this connection intended to be bolted together with the flange 1D on the connection piece 1E of the cyclone 1. Subsequently, the rear end of the insertion pipe can, with its rear flange 2F, be bolted together with the valve 4, with the front flange 4B of the latter, and finally the rear flange 4A of the valve is bolted together with the end flange 3A of the inlet pipe 3.

Figure 3:
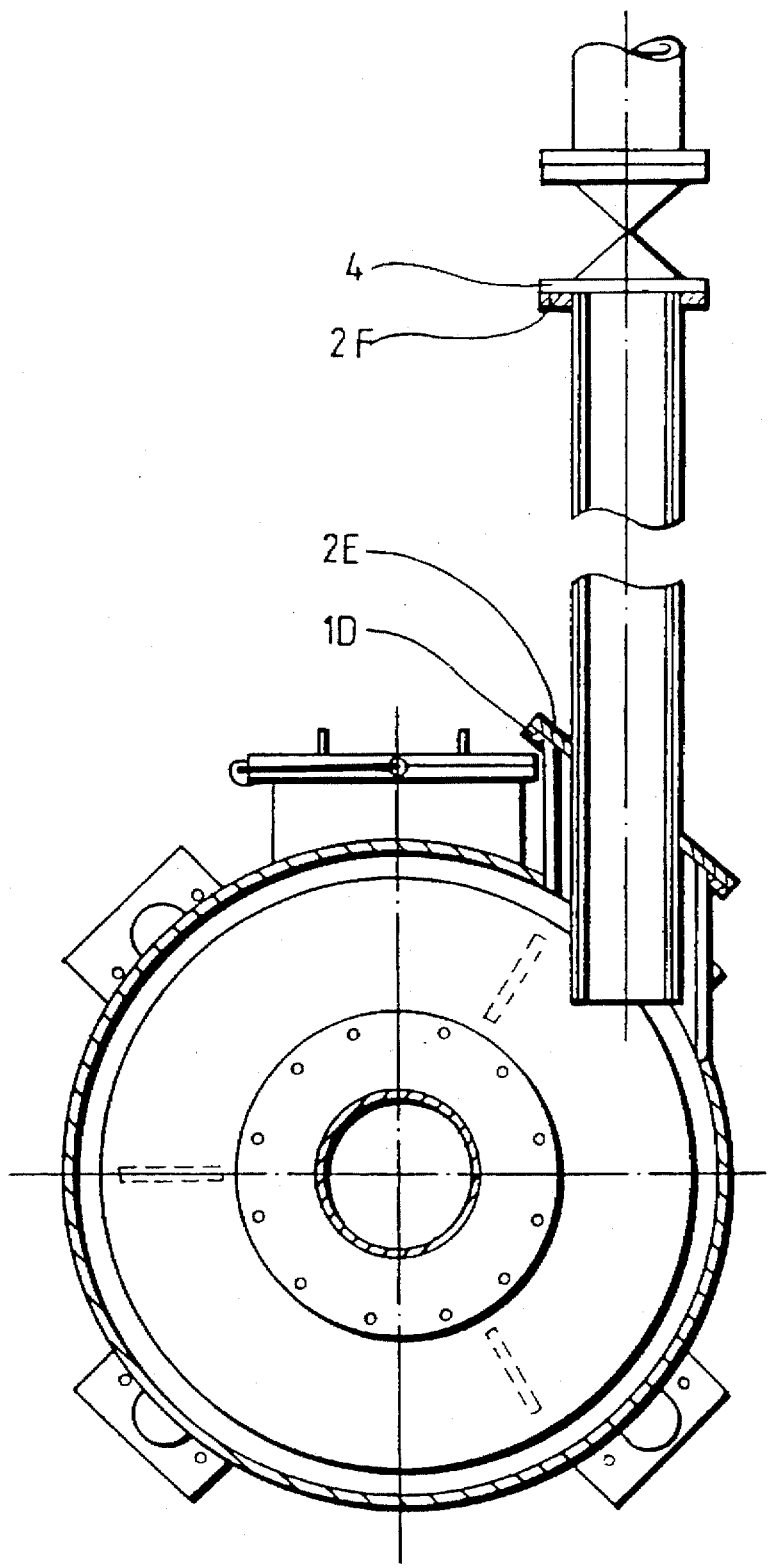

In FIG. 3, an alternative assembly and embodiment of an insertion pipe according to the invention is shown. This alternative embodiment consists of an insertion pipe 2 which does not require division in order to be capable of being mounted but in which instead the front flange 2E is obliquely mounted in order to make possible mounting of the insertion pipe 2. As a result of this, the flange 1D on the cyclone 1 is of course also arranged so that it forms an angle in relation to the actual extension of the insertion pipe 2 in the mounted state. The rear flange 2F of the insertion pipe is made according to what was described previously and is intended to be connected directly onto the valve 4 which therefore does not need to be demounted in this case. When the insertion pipe 2 is to be mounted, its front end 2D is first guided in through the connection piece opening into the cyclone 1 and is inserted so far that the flange 2E bears against the connection piece flange 1D. Subsequently, the insertion pipe 2 can be displaced parallel along the connection piece flange 1D to its correct position, the rear flange 2F of the pipe bearing against the valve 4.

Figure 4:
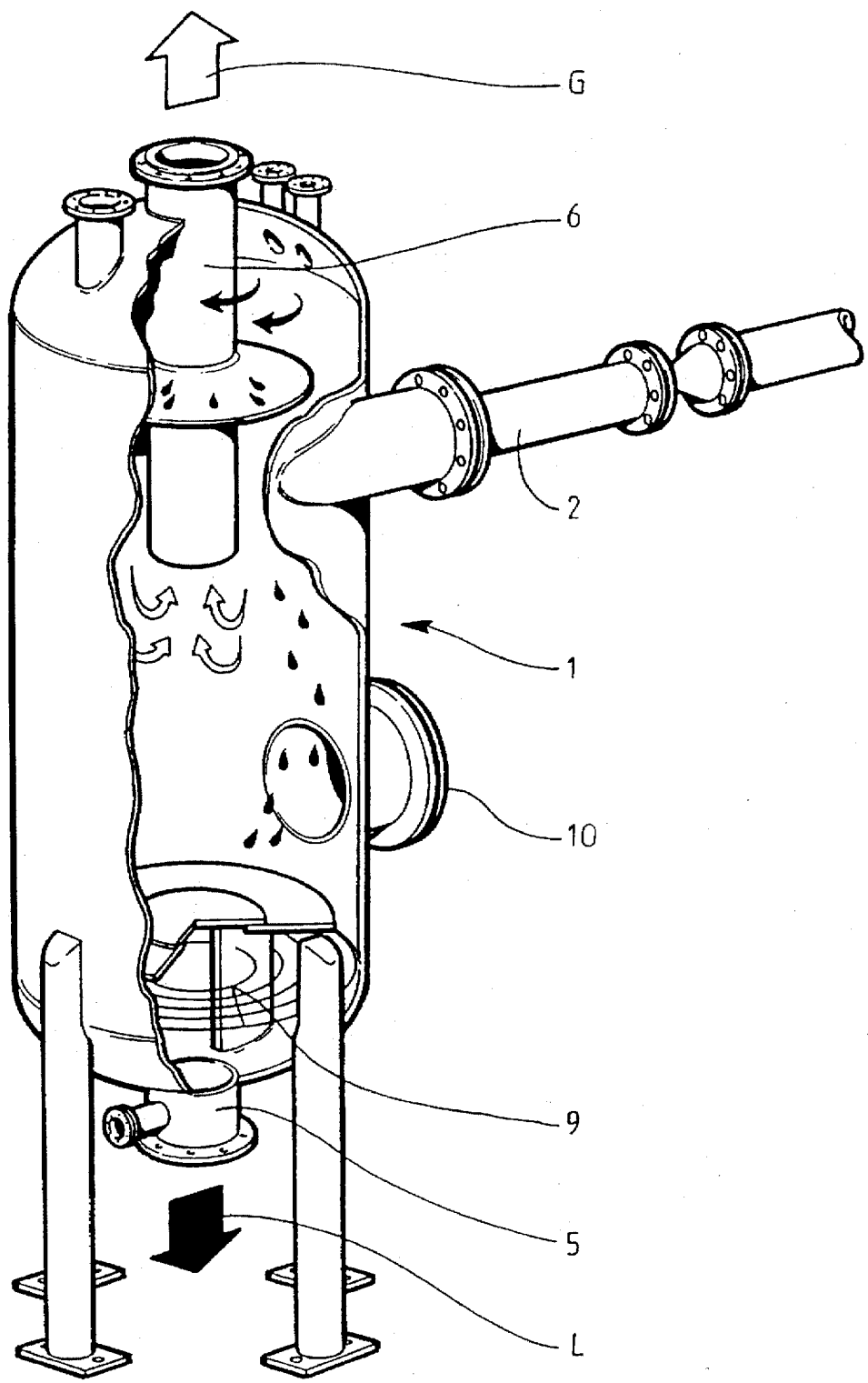

In FIG. 4, a perspective view of a partially cut-away cyclone according to the invention is shown, the drawn-off liquid being marked with "L" and the separated gas which is drawn off at the top being marked with a "G".

As indicated previously, use must in many cases be made of a number of series-connected cyclones in order to bring down the pressure to or almost to atmospheric level and such a simulated case is described below, which relates to black liquor which is drawn off from a continuous digester with an output of 900 tonnes/day. With the aid of three series-connected cyclones with insertion pipes of different diameters, it will be possible for the pressure reduction to take place in stages and at the same time the inlet rate will in principle be the same in the inlet to each cyclone. The outgoing vapour pipe diameter and effective length will also be the same for all cyclones in the three-stage system. In this preferred case, use is made of a cyclone with an internal diameter which is 2 m and the effective height of which is also 2 m. The diameter of the inlet pipe is 200 mm in the first stage. With a boiling-liquid pressure which corresponds to 4–5 bar, an inlet rate corresponding to approximately 40 m/sec is obtained in this connection, which is an optimum rate for a cyclone thus constructed. In order to achieve effective utilisation of the centrifugal force in order to "break up foam" in cyclones of these dimensions (diameter greater than 1 meter), the inlet rate should exceed 30 m/s. In the second stage, a corresponding inlet rate is obtained in spite of separation of gas if an insertion pipe is selected with a diameter of 400 mm on the insertion pipe and a pressure reduction of approximately 2 bar is obtained. In the final pressure reduction (cyclone 3) down to close to atmospheric pressure (approximately 1.1–1.3 bar), use is made of an insertion pipe with a diameter of approximately 450 mm in order to obtain here also the required inlet rate (40 m/sec).

The invention is not limited by that shown above but can be varied within the scope of the following patent claims. The expert in the field will consequently understand that use can be made, for example, of conical gables instead of the cupped gables. Furthermore, it may be advantageous in certain cases, instead of the completely cylindrical casing wall, likewise to provide it with a certain conical form. In order to make possible mounting of the insertion pipe, it is also possible to divide it up into a front and a rear part with non-angled flanges, which also makes possible exchange without the valve needing to be removed. Finally, it should be clarified that the length of the insertion pipe means the part of the insertion pipe which actively functions to recreate an even flow pattern after a relatively great pressure drop (such as after a regulating valve), which part normally means the final part of the insertion pipe. Furthermore, it is obvious for the expert in the field that this final part advantageously has an internal surface which is completely smooth/plane in the direction of flow, in order to counteract the appearance of turbulence/pressure drop. It is obvious for the expert in the field that the cyclone can advantageously be used in many other connections than those which have been exemplified above, for example for separating gas bubbles from a non-pressurised liquid, liquid from a pressure diffuser etc.

We claim:

1. In a first cyclone for separating a gas from a liquid stream, said cyclone including an upper portion, said upper portion having an inlet opening for said liquid stream, the improvement comprising: at least one interchangeable insertion pipe, said at least one interchangeable insertion pipe having a preselected and constant cross-sectional area, having a diameter which is less than the diameter of said inlet opening, and having a length of greater than about 1 meter, said at least one interchangeable insertion pipe being adapted for insertion into said inlet opening and adapted for connection to a supply line for said liquid, said supply line including pressure drop creating means therein, wherein said at least one interchangeable insertion pipe can be interchangeably inserted into said inlet opening.

2. The cyclone of claim 1 wherein said exchangeable insertion pipe is sized and shaped to accommodate a liquid stream of spent cooking liquor from the production of pulp.

3. The cyclone of claim 1 wherein said insertion pipe has a length of greater than about 2 meters.

4. The cyclone of claim 2 wherein said insertion pipe has a length of between about 2.5 and 3.5 meters.

5. The cyclone of claim 1 further comprising a second cyclone for separating a gas from a liquid stream exiting from said first cyclone, said second cyclone including an upper portion, said upper portion having an inlet opening for said liquid stream, the further improvement comprising: at least one second interchangeable insertion pipe, said at least one second interchangeable insertion pipe having a preselected and constant cross-sectional area, having a diameter which is less than the diameter of said inlet opening of said second cyclone, and having a length of greater than about 1 meter, said at least one second interchangeable insertion pipe being adapted for insertion into said inlet opening of said second cyclone and for connection to a second supply line for said liquid from said first cyclone, said second supply line including pressure drop creating means therein, wherein said at least one second interchangeable insertion pipe can be interchangeably inserted into said inlet opening of said second cyclone.

6. The cyclone of claim 1 further comprising a casing including said upper portion and a lower portion, a liquid outlet in said lower portion of said casing, and a gas outlet disposed in said upper portion of said casing.

7. The cyclone of claim 6 wherein said casing is cylindrical.

8. The cyclone of claim 6 wherein at least one end of said casing comprises the shape of a cupped gable.

9. The cyclone of claim 6 wherein said gas outlet includes a lower end within said casing, and wherein said insertion pipe includes an inner end within said casing, said inner end of said insertion pipe being located above said lower end of said gas outlet.

10. The cyclone of claim 9 including collar means disposed within said cyclone and mounted on the outer surface of said gas outlet.

11. The cyclone of claim 10 wherein said collar means has a conical configuration.

12. The cyclone of claim 10 wherein said collar means is located above said inner end of said insertion pipe.

13. The cyclone of claim 6 including plate means at the lower end of said casing, said plate means arranged substantially horizontally therein to assist in separating said gas from said liquid therein.

14. The cyclone of claim 13 wherein said plate means includes an outer periphery separated from the inner surface of said casing by at least about 20 mm.

15. The cyclone of claim 14 wherein said plate means comprises circular plate means.

16. The cyclone of claim 6 wherein said casing has an external diameter of greater than about 1 meter, and wherein said casing has a height which is greater than said external diameter of said casing.

17. The cyclone of claim 16 wherein said external diameter of said casing is between about 1.5 and 2.5 meters.

18. The cyclone of claim 16 wherein said height of said casing is between about 1.5 and 2 times said external diameter of said casing.

19. The cyclone of claim 16 wherein each of said gas outlet and said liquid outlet has a diameter greater than about 0.3 meters.

20. The cyclone of claim 1 wherein said insertion pipe comprises first and second insertion pipe portions facilitating the interchangeability thereof.

* * * * *